United States Patent [19]

Benjamin et al.

[11] 4,311,211

[45] Jan. 19, 1982

[54] SERVICE SYSTEM

[75] Inventors: Fred W. Benjamin, Oakland; Paul M. Leah, Prospect Park, both of N.J.

[73] Assignee: American Standard Inc., New York, N.Y.

[21] Appl. No.: 65,709

[22] Filed: Aug. 10, 1979

[51] Int. Cl.[3] .................... B60M 7/00

[52] U.S. Cl. .................... 186/53; 104/302; 186/58; 186/7

[58] Field of Search .................... 186/7, 26, 28, 33, 34, 186/37, 41, 53, 58; 104/288, 289, 290, 295, 302

[56] References Cited

U.S. PATENT DOCUMENTS

| | | | |
|---|---|---|---|
| 2,193,623 | 3/1940 | Dozler | 104/289 |
| 2,254,285 | 9/1941 | Harris et al. | 104/302 X |
| 2,397,185 | 3/1946 | Krapf | 104/302 |
| 3,506,862 | 4/1970 | Nomura et al. | 104/290 X |
| 3,636,883 | 1/1972 | Wesener | 104/50 |

FOREIGN PATENT DOCUMENTS

| | | | |
|---|---|---|---|
| 2539133 | 3/1976 | Fed. Rep. of Germany | 104/302 |

*Primary Examiner*—Robert J. Spar
*Assistant Examiner*—Edward M. Wacyra
*Attorney, Agent, or Firm*—Robert G. Crooks; John P. Sinnott; James J. Salerno, Jr.

[57] ABSTRACT

A typical embodiment of the invention described herein discloses a prepared and packaged food delivery system that permits one attendant to serve several car ports. An electrically driven carrier for transporting a gimballed tray for money and foodstuffs has a dynamic brake that permits the carrier and tray to coast to a stop and, if desired, reverse direction after a brief delay. This feature prevents spillage. An additional feature of the invention provides advertising space illumination on the carriage with adjustable illumination time.

2 Claims, 5 Drawing Figures

SERVICE SYSTEM

This invention relates to delivery systems and, more particularly, to a control for a track and gimballed travelling basket apparatus that transports money, foodstuffs, and the like.

Through the years any number of proposals have been advanced for conveying cash, merchandise, files and such between a central facility to a point-of-use at a remote station.

The popularity, for example, of automobile drive-in restaurants has made the need for reliable prepared and packaged food delivery systems a matter of public convenience and economic importance. Illustratively, a drive-in port at a packaged food restaurant usually has a teller's booth that serves, in turn, each vehicle as it arrives at the teller's window. With this system, the teller is confronted with a great deal of idle time while the customer (or customers) are studying the menu, placing the order and paying for the food. Further time is lost to the teller while the order is being assembled and packaged for the customer.

Not only does this system use the teller's time in an inefficient manner, but it also requires the services of several tellers and teller's booths, each to service a respective car port at high customer volume locations. Consequently, there is a need to provide a system that will enable one teller, working at one booth, to serve the customers in more than one automobile at about the same time.

In accordance with the invention, however, these needs are largely satisfied through an improved tray conveyor system. These improvements, however, enable one teller to service two or more car ports for packaged food delivery. Illustratively, the track for the delivery carriage and tray combination form a number of inverted U-shaped tracks to permit each track to pass successively over adjacent car ports which are breasted out from the teller's position.

A number of additional and very important features also are provided through the electrical control system for the carriages which traverse these tracks. The fundamental basic functions also are provided which enable the teller to transfer a packaged order from the loading point at the teller's location to the delivery location at a particular car port and which enable the purchaser to send the carriage back to the teller's position.

Illustratively, it is often necessary to stop the carriage before it reaches the delivery point and return this carriage to the teller's position to accommodate last-minute order changes, and the like. There is the further need for the teller to send the carriage back to the delivery location after it has begun its travel from the delivery location to the teller's location. Because the carriage and tray combination must accommodate travel along a track that describes an inverted U, it is necessary to gimbal the tray to the carriage and to provide the tray with a relatively low center of gravity in order to prevent tray contents spillage during travel. In these circumstances if it is necessary for the teller to stop the carriage in mid passage and reverse its direction, the combination of low center of gravity and gimballing normally would cause the tray to sway or to oscillate in a pendulum-like manner. Accordingly, a salient feature of the invention is the provision within the control system of both a dynamic electrical brake and a brief time delay before carriage direction is reversed. This dynamic brake enables the carriage to coast gently to a stop. Before changing direction the delay before carriage direction is reversed, moreover, permits the tray momentum to dissipate. These features of the control system essentially eliminate any pendulum-like tray oscillations that otherwise might occur. In this respect, it has been found that mechanical brakes and mechanical damping devices are not suitable for the purposes of the invention. These devices do not influence the motion of the tray until after the carriage has stopped, in which instance a certain amount of swaying is inevitable.

There is a further need to provide illumination for the carriage to attract customers' attention to special sales, featured menu items and the like. To economize on electrical power, as well as to enhance its attention arresting potential, it is desirable for the source of illumination to flash on as the carriage arrives at the delivery location and then to automatically turn off after a suitable interval has elapsed. Ordinarily, small fluorescent lamps would be desirable for this purpose because of the more uniform light distribution and low power consumption that these devices provide. It has been found, however, that frequently switching these lamps on and off undesirably shortens their service lives. Because of volume limitations within the carriage, small "flashlight" size incandescent lamps also might be considered. In this latter instance, to provide suitable illumination a massive and complicated bank of about forty of these lamps are required.

Automotive incandescent lamps with a twelve volt rating would seem to provide an excellent compromise between service life, adequacy of illumination and simplified installation. These lamps display a number of characteristics that make application to this system quite difficult. Illustratively, these lamps tend to draw a very large current when initially illuminated. After reaching a stable operating temperature this current undergoes a sharp decrease in magnitude.

In accordance with a major feature of the invention, these otherwise difficult lamp characteristics are overcome.

These and other features of the invention will become more apparent through consideration of the following description of a detailed embodiment of the invention, taken in conjunction with the drawing. The scope of the invention, however, is limited only through the claims.

Figure 2:
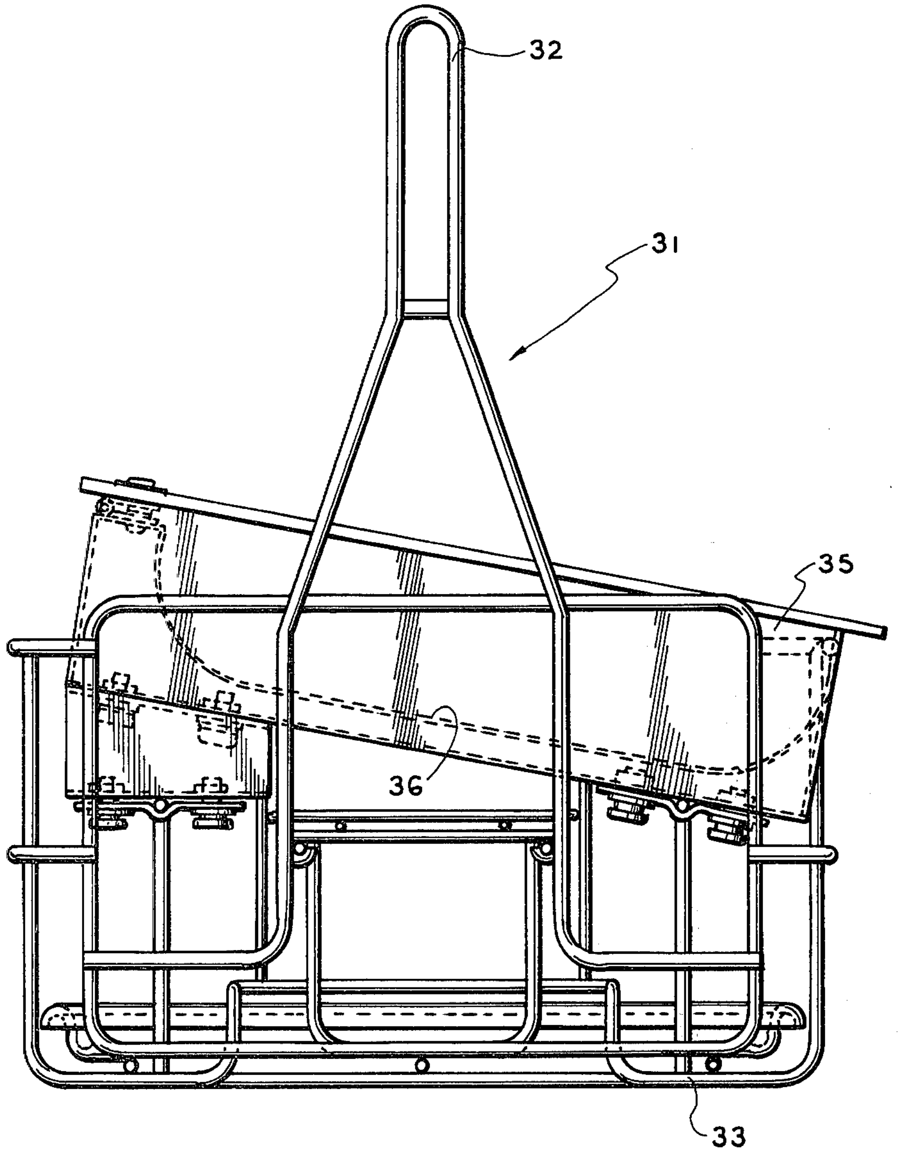
FIG. 2 is a side elevation of a tray for attachment to a carriage that characterizes features of the invention.
Figure 3A:
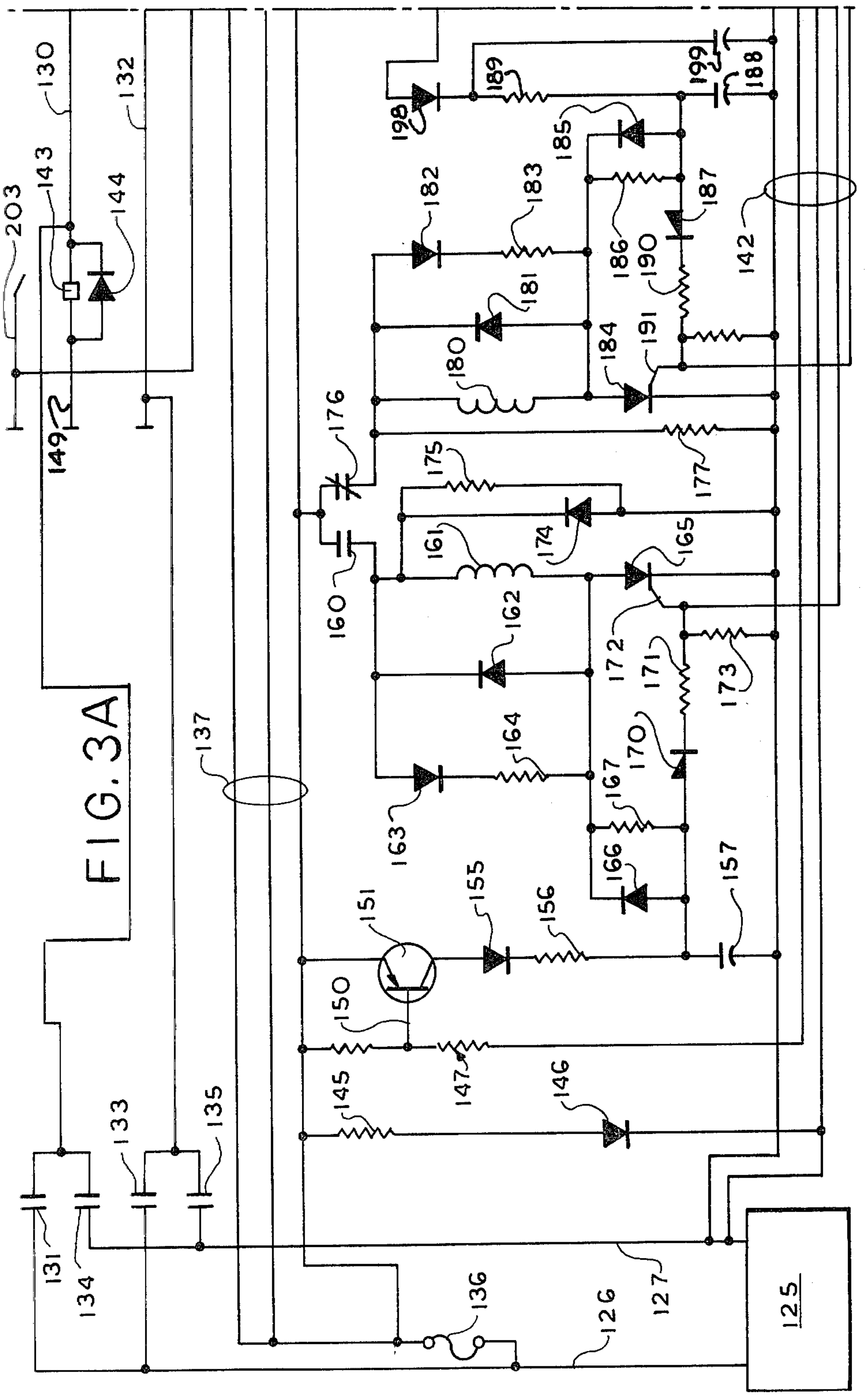
Figure 3B:
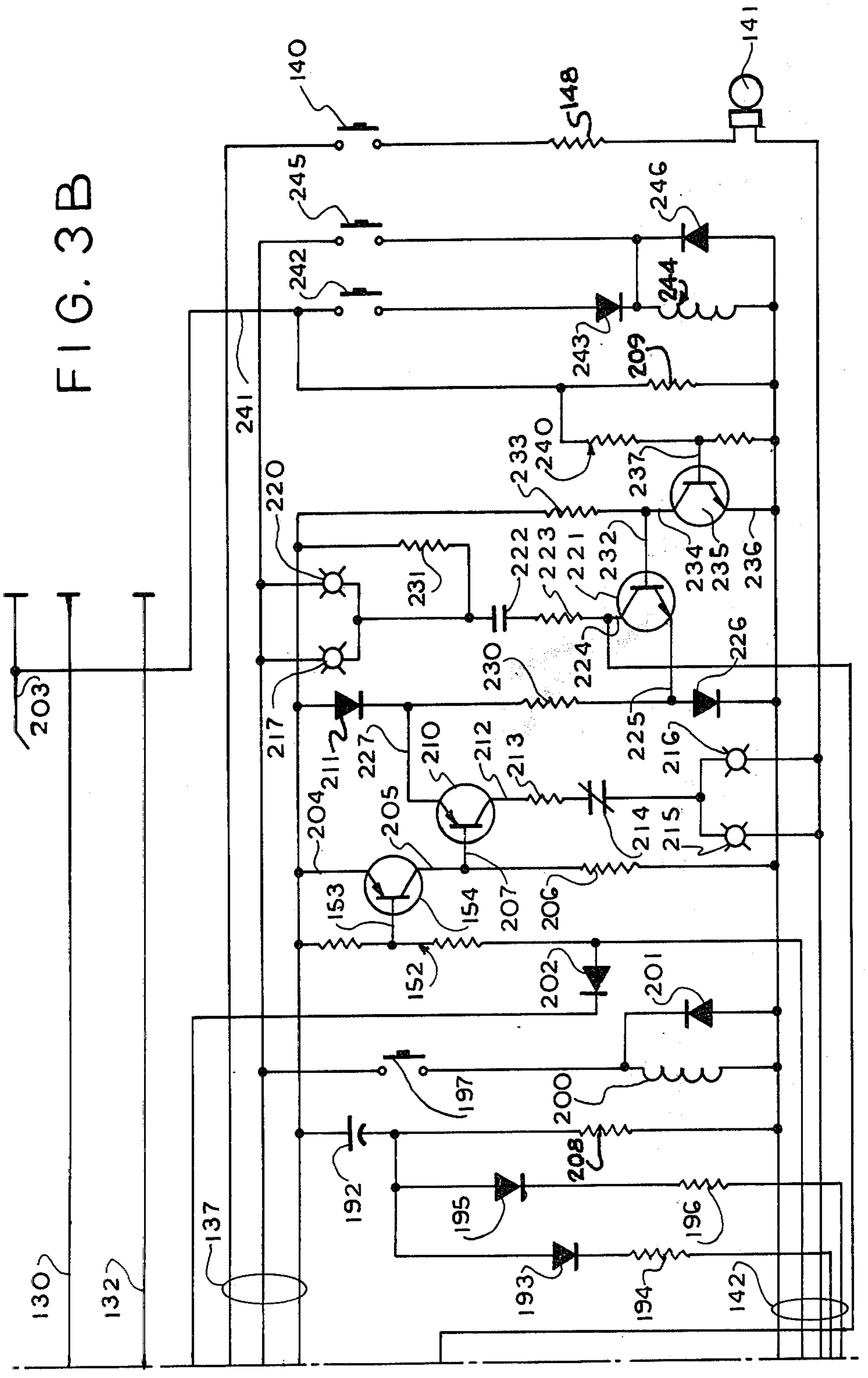
Figure 4:
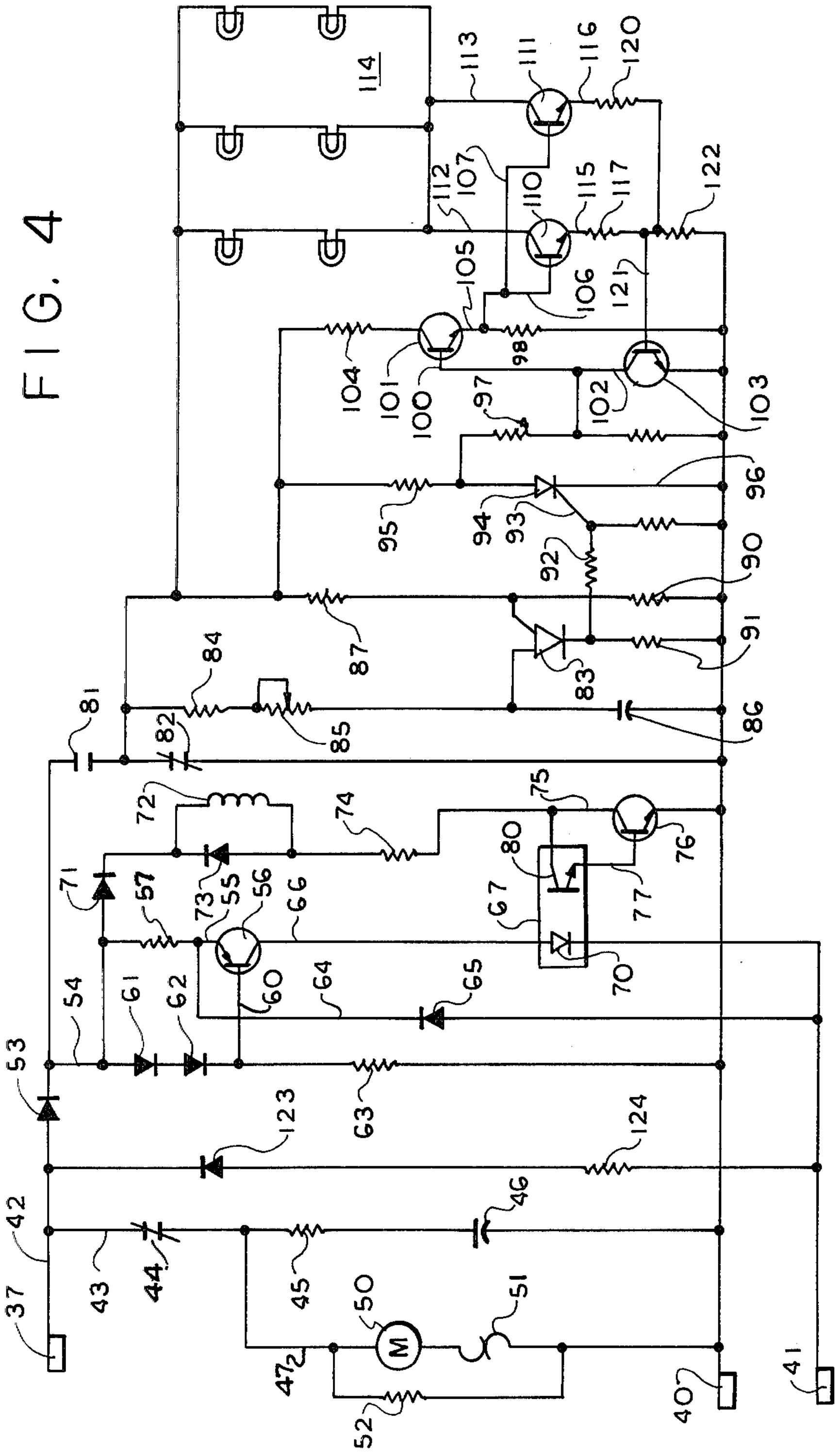

FIG. 3A and 3B, when placed side-by-side with FIG. 3A to the observer's left of FIG. 3B, present a schematic diagram of an electrical circuit for controlling the operation of a carriage to transport a tray of the type shown in FIG. 2; and FIG. 4 is a schematic diagram of an electrical circuit installed within the carriage that embodies further principles of the invention.

Figure 1:
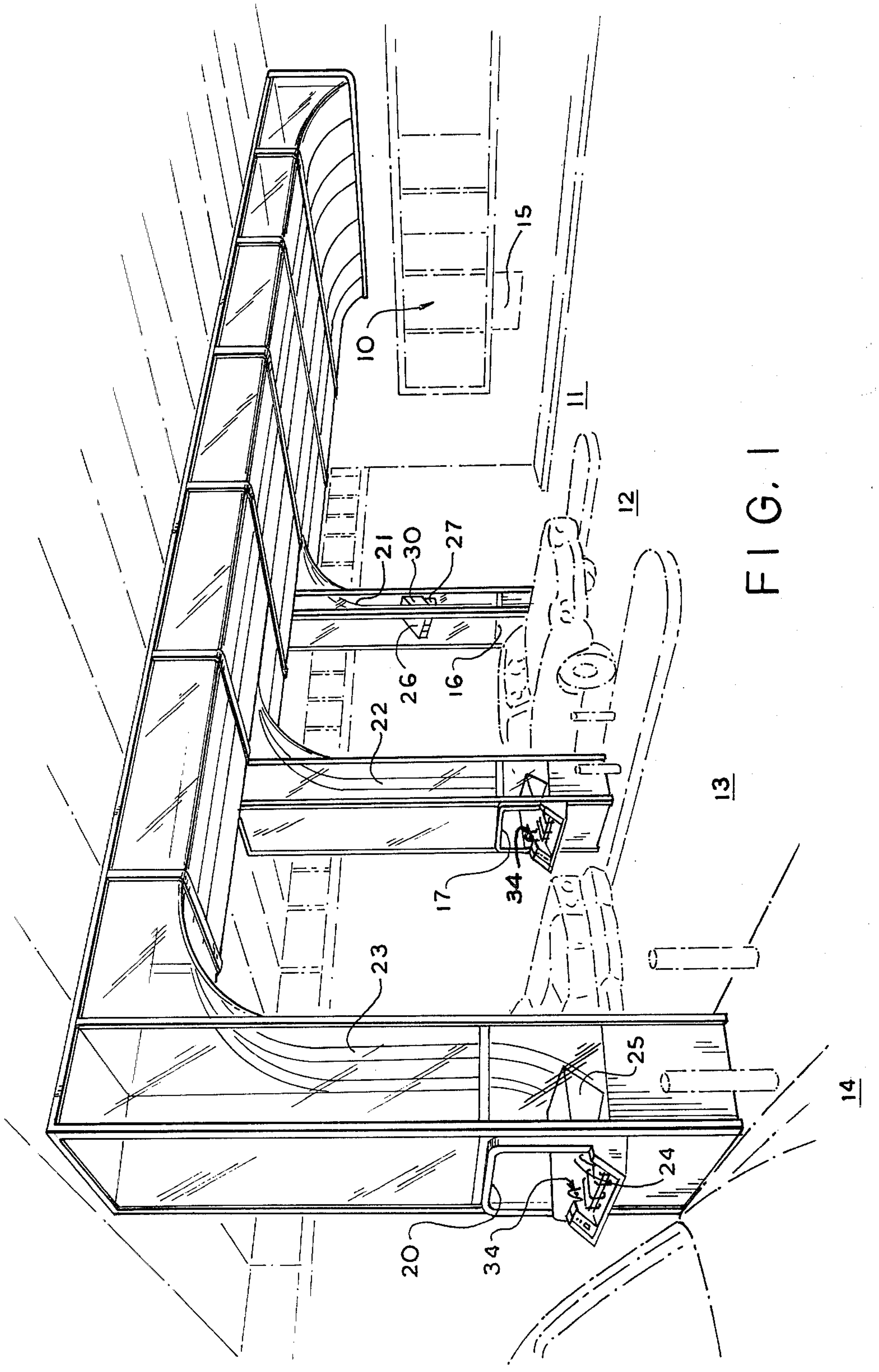
FIG. 1 is a perspective view of a typical installation embodying features of the invention.

For a more complete appreciation of the invention attention is invited to FIG. 1 which shows a teller location 10 which services car ports 11,12,13 and 14 each with a respective delivery location 15,16,17 and 20. To transport packaged foods from the teller location 10 to the delivery locations, individual tracks 21,22, and 23 are provided for the delivery locations 16, 17 and 20 respectively. The delivery location 15 as shown in FIG.

1 can be serviced directly by the teller at the location 10. As illustrated, each of the tracks 21,22,23 has a generally inverted U shape, the base lengths of each of these tracks being determined by the number of car ports that the particular track must span in order to terminate at a specific delivery location.

As best illustrated in FIG. 1, a tray 24 is gimballed or pivoted to the body of an electrically driven carriage 25 in a manner that enables the center of gravity of the tray 24 to be generally below the pivot point of the carriage 25. Packages of prepared food 26 are shown on a tray 27 which carriage 30 is transporting to delivery location 16.

A typical tray 31 is shown in FIG. 2. The tray 31 is assembled from heavy gauge steel wire welded at suitable points. To provide a low center of gravity for this application a wire loop 32 protrudes above a basket portion 33 of the tray 31. The loop 32 (and a companion loop not shown in the FIG. 2 projection) is gimballed or pivoted to the carriage 25 (FIG. 1) by means of a pin 34 that is slidably received within the bight of the loop.

For the convenience of both the customer and the teller a plastic money cup 35 with a lid and which has a deep recessed basin 36 for holding currency and change is tilted at an angle of about 10° relative to the basket portion 33 in order to expose the contents and make them more accessible to the customer.

A motor control circuit is provided within the carriage 25, as shown in FIG. 4. Three brushes 37, 40 and 41 supply power and signaling functions for the carriage circuit as described subsequently in more complete detail. Thus, the brushes 37 and 40 are coupled electrically to the power rails of the track system and the brush 41 is coupled electrically to a third signaling rail of the track system (not shown in the drawing).

Circuit continuity is established from the brush 37 through a conductor 42 to the brush 40 by way of a conductor 43 normally closed relay contacts 44, a resistor 45 and a capacitor 46. A parallel circuit 47 is connected between the normally closed contacts 44 and the resistor 45 and the brush 40. This parallel circuit includes carriage drive motor 50 and a thermal protective device 51 in series with the motor 50. A dynamic braking resistor 52 also is coupled across the motor 50 and the thermal protective device 51.

The conductor 42 also is coupled through a diode 53, and through the diode 53 and a conductor 54 to an emitter 55 of a PNP transistor 56 by way of a resistor 57. The conductor 54 also is coupled to a base circuit 60 through a pair of series connected diodes 61, 62. Continuity for the base circuit 60 is completed to the brush 40 through a resistor 63. A conductor 64 also couples the brush 41 to the emitter 55 of the transistor 56 through a diode 65.

Collector circuit 66 of the transistor 56 also is connected to the brush 41 through an optical coupler circuit 67, the collector circuit 66 being connected to a light emitting diode 70.

The conductor 54 also is connected through a diode 71 to the winding of a relay 72. As illustrated, the relay 72 is connected in parallel with a diode 73. Both the winding of the relay 72 and the diode 73 are connected through a resistor 74 to the collector 75 of a NPN transistor 76. The collector 75 of the transistor 76 also is connected to the transistor base circuit 77 by way of a photo transistor 80 within the optical coupler circuit 67.

Thus, light emitted from the diode 70 stimulates the base circuit of the photo transistor 80 in order to enable the photo transistor to conduct current as appropriate.

The conductor 54 also is connected to normally open relay contacts 81 and through normally closed relay contacts 82 to the brush 40. Normally open relay contacts 81 control circuit continuity for an anode terminal of programmable unijunction transistor 83 through a path that includes a resistor 84, and a trimming potentiometer 85. A capacitor 86 couples the potentiometer 85 and the anode terminal to the transistor 83 to the brush 40. The normally open relay contacts 81 also are connected to the gate terminal of the transistor 83 by way of a resistor 87 and a voltage dividing resistor 90 which couples the gate input terminal of the transistor 83 to the brush 40. The cathode of the transistor 83 is connected through a resistor 91 to the brush 40. This cathode terminal for the transistor 83 also is connected through a resistor 92 to the control electrode 93 of a silicon controlled rectifier 94.

The rectifier 94 also is connected to the normally open relay contacts 81 through a resistor 95 and from the cathode terminal of the rectifier 94 through a conductor 96 to the brush 40.

Voltage dividing resistors 97 also are connected in parallel with the silicon controlled rectifier 94 between the resistor 95 and the brush 40. This voltage divider 97 is coupled to base circuit 100 of NPN transistor 101 and to collector circuit 102 of NPN transistor 103. The emitter of transistor 103 is connected to brush 40.

As shown in FIG. 4, the collector for the transistor 101 is connected to the normally open relay contacts 81 through a resistor 104. The emitter circuit 105 of the transistor 101 is connected directly to base circuits 106, 107 of NPN transistors 110, 111, respectively. Additionally, base circuits 106 and 107 are connected to brush 40 by resistor 98.

In accordance with an important feature of the invention, the collectors 112, 113 of the transistors 110, 111 respectively are connected in parallel to a lamp bank 114. The lamp bank 114 is comprised of six 12-volt automotive incandescent lamps, pairs of which are connected in series to provide three parallel paths, each of two series connected lamps.

Both of the emitter circuits 115, 116 of the transistors 110, 111 respectively also are connected in parallel through individual resistors 117, 120 to a base circuit 121 of the transistor 103. The common junction between the base circuit 121 and the resistors 117, 120 is connected through a resistor 122 to the brush 40. In completing the description of the circuit components within the carriage it also should be noted that the conductor 42 is coupled through a diode 123 and a series connected resistor 124 to the brush 41.

The carriage 30 as shown in FIG. 1 is controlled at the teller location 10 and the delivery location 16 through the circuit that is shown in FIGS. 3A and 3B. Illustratively, a direct current power supply 125 provides a potential difference of 28 volts between the conductors 126, 127. Circuit continuity from the conductor 126 is established with the rail 130 through normally open relay contacts 131 and with the rail 132 through normally open relay contacts 133.

In an analogous circuit, continuity is established for the conductor 127 through to the rail 130 by way of normally open relay contacts 134 and with the rail 132 through normally open relay contacts 135. The conductor 126 is further connected through a fuse 136. The cable 137 illustratively consists of lands on a printed circuit board, a harness in the control box and a conductor in the interconnecting cable.

All of the conductors in the cable 137 enjoy a common potential, or voltage. The cable 137, moreover, is routed to a particular delivery location (e.g. delivery location 16 in FIG. 1). At the delivery location a normally open spring loaded switch 140 is connected in series with a bell 141 and a resistor 148. The bell 141 is positioned at the teller location 10. The balance of the circuit from the bell 141 back to the power supply 125 is completed through one of the common potential conductors in a cable 142 that couples the bell 141 to the conductor 127. Cable 142 is similar in construction to the cable 137.

As shown in FIG. 3A adjacent to the teller location a rail isolator 143 is provided to interrupt circuit continuity through the rails and provide dynamic braking for the carriage as it approaches the teller location in a manner described subsequently in more complete detail. A diode 144 is connected in parallel with the rail isolator 143 to provide circuit continuity through the rail 130 when the proper polarity voltage is applied to the rail. At the teller location, a resistor 145 connected in a series with a light emitting diode 146 bridges one of the common conductors in cable 137 and a conductor in the cable 142 that is connected to the conductor 127.

A pair of resistors forming a voltage divider 147 coupled to base circuit 150 of PNP transistor 151 is connected between a common conductor in the cable 137 and a conductor in cable 142. In a similar manner, a voltage divider 152 for base circuit 153 of a PNP transistor 154 also is connected, on one side to the cable 137 and on the other side, through a conductor in the cable 142 to the base circuit voltage divider 147 for the transistor 151. The emitter for the transistor 151 is also connected to the cable 137. The collector electrode of the transistor 151, however, is connected by way of the diode 155, a resistor 156, and a capacitor 157 to one of the conductors in the cable 142 that is coupled to the conductor 127.

Normally open relay contacts 160 connect a common potential conductor in cable 137 to the winding of a relay 161. The relay winding 161, moreover, is connected in parallel with a diode 162 and in parallel with a combination diode 163 and resistor 164. These parallel connections all are coupled to the anode terminal of a silicon controlled rectifier 165. A further diode 166 also is connected to the common junction for these parallel circuits (along with a similarly connected parallel resistor 167). The common terminal for the diode 166 and the resistor 167, however, is coupled to an anode terminal of the triggered diode 170 and to the junction of capacitor 157 and resistor 156. The cathode terminal for the triggered diode 170 is connected through a resistor 171 to gate electrode 172 of the rectifier 165. A further resistor 173 couples the gate electrode 172 to a common potential conductor in the cable 142. The cathode of rectifier 165 is connected to conductor 127 through cable 142. There is a further parallel combination diode 174 and resistor 175 which are connected between the cable 137 and the conductor 127.

Normally closed relay contacts 176 connect the cable 137 through a resistor 177 to the conductor 127. The normally closed relay contacts 176 also are connected to the winding of a relay 180 which is coupled in parallel with both a diode 181 and with another parallel branch that comprises a diode 182 in series with a resistor 183.

In a circuit configuration similar to that which was described in connection with the rectifier 165, another silicon controlled rectifier 184 is connected to the common terminal of the parallel circuits mentioned in connection with the relay 180. Diode 185 and parallel resistor 186 also are connected from the common terminal for the relay 180 and the diode 181 and resistor 183 to the anode terminal of a triggered diode 187. The cathode terminal for the diode 187 is connected through a resistor 190 to gate electrode 191 of the rectifier 184. The cathode terminal of the rectifier 184 is connected through the cable 142 to the conductor 127. The capacitor 188 also is connected to a resistor 189 and a diode 198. A capacitor 199 is coupled between the resistor 189 and the diode 198.

The capacitor 192 also is connected from the cable 137 through a diode 193 and a resistor 194 to the gate electrode 172 for the silicon controlled rectifier 165. Similarly, a diode 195 coupled in series with a resistor 196 also is connected between the capacitor 192 and the gate electrode 191 of the silicon controlled rectifier 184. Resistor 208 is connected between capacitor 192 and conductor 127 through cable 142.

Further in this regard, the cable 137 is connected to the conductor 127 through the cable 142 by way of a normally open spring loaded switch 197 and a relay winding 200 that is connected in parallel with a diode 201. The voltage divider 152 considered above with respect to the base circuit 150 for the transistor 151 also is connected by way of a diode 202 to the third rail 203 near the teller's location.

The transistor 154 is connected between the cable 137 through its emitter electrode 204 and through its collector electrode 205 and a resistor 206 to the conductor 127 by means of a conductor in the cable 142.

Base circuit 207 for PNP transistor 210 also is coupled to the collector electrode 205 of the transistor 154. The emitter electrode for the transistor 210 is connected to the cable 137 by way of a diode 211. Collector electrode 212 completes the circuit to the power supply conductor 127 through a path that includes resistor 213, normally closed relay contacts 214 and parallel connected signal lamps 215, 216 which are coupled to a common potential conductor in the cable 142. Cable 137 also is connected to cable 142 by a further parallel set of signal lamps 217, 220 which are connected to an NPN transistor 221 by way of normally open relay contacts 222, a resistor 223 and a collector electrode 224. The emitter electrode 225 is connected to cable 142 through diode 226. The emitter electrode 225 is connected to the emitter electrode 227 for the transistor 210 by way of a resistor 230. A further resistor 231 is connected between cable 137 and a junction between the signal lamps 217, 220 and the normally open contacts.

The base electrode 232 for the transistor 221, moreover, is connected to the cable 137 by way of a resistor 233. This base electrode also is coupled to a collector electrode 234 for an NPN transistor 235. The NPN transistor 235 has an emitter electrode 236 that is coupled through the cable 142 to the conductor 127. Base electrode 237 is connected to a voltage divider 240 which voltage divider, in turn, is coupled to the third rail 203 at the delivery location through a conductor 241. A resistor 209 is connected in parallel with voltage divider 240.

The conductor 241 also is connected in parallel through a normally open spring loaded switch 242, a diode 243, the winding of a relay 244 and the cable 142 to the conductor 127. The cable 137 also is connected through a normally open spring loaded teller return switch 245 at the delivery location.

The teller return switch 245 is connected to the winding for the relay 244 and to a diode 246 which also is connected in parallel with the winding for the relay 244.

In operation, a customer at the delivery location 16 (FIG. 1) wishes to place an order for packaged and prepared food from an attendant at the teller location 10. To gain the attendant's attention and as best shown in FIG. 3, the customer presses the service switch 140 to complete the electrical circuit for the bell 141 at the teller location through a path from the power supply 125, the conductor 126, the fuse 136, one of the common potential conductors in the cable 137, the now closed service switch 140, the winding for the bell 141, a common potential conductor in the cable 142, and the conductor 127.

Assuming for the moment that the carriage 30 (FIG. 1) and its associated tray 27 are at the delivery location 16, the attendant at the teller location 10 calculates the cost of the order and informs the customer of the amount through a voice communications system.

The customer places an appropriate amount of money in the basin 36 (FIG. 2) of the tray. Note in this regard that the money cup 35 not only has the deep basin 36 and a transparent cover to retain bills and change but the cup 35 also can be tilted through an angle of about 10° by means of a hinge arrangement. This tilting feature facilitates placing money in the basin and withdrawing it from the basin, thereby further saving the valuable time and effort that is so important in a high volume traffic environment.

To send the money and the tray 27 (FIG. 1) to the teller location 10, the motor (not shown in FIG. 1) within the carriage 30 is energized and the tray 27, which is gimballed to the carriage, travels along the inverted U-shaped track 21 to the teller. During this movement to the teller location 10, the low center of gravity of the tray 27 that is provided by the loop 32 which is pivoted to the carriage 30 enables the tray to remain properly oriented relative to the horizontal in spite of the fact that the carriage and tray combination must execute two rather abrupt 90° changes in direction.

The free rotation of the tray 27 relative to the carriage 30 which permits the tray to retain its orientation relative to the vertical and horizontal nevertheless imparts a certain amount of instability to the tray. Thus, abruptly interrupting the movement of the carriage at the teller location 10 will cause the tray to swing in a pendulum-like motion. Consequently, and as shown in FIG. 3, the rail 130 is provided with a section of "dead" rail, that is a rail isolation section 149 that interrupts electrical circuit continuity for the motor 50 (FIG. 4) in the carriage 30 as it approaches the teller location, thereby causing the carriage and tray combination to coast to a stop. Coasting gradually to a stop effectively prevents the tray from swinging. In this manner, the change and bills in the tray's money cup are not placed in danger of being tossed out of the cup as the tray stops.

Turning again to FIG. 3, to propel the carriage to the teller location, the customer closes the normally open customer send switch 242. With the carriage stopped at the delivery location the relay 161 is energized by the attendant closing the normally open teller send switch 197 (FIG. 3). Thus a circuit is temporarily completed from the power supply 125 through the conductor 126, the fuse 136, a common potential conductor in the cable 137, the now closed switch 197, and the relay winding 200 and back to the power supply by way of a common potential conductor in the cable 142 and the conductor 127, thereby closing the contacts 133 and 134 to apply power to the rails 132 and 130, respectively. As the carriage returns to the teller location, the carriage return lamps 215 and 216 are illuminated at the teller location in the following manner. The relay 180 is energized through a path that includes power from the supply 125 through the conductor 126, fuse 136, a common potential conductor in the cable 137, the normally closed contacts 176, the relay 180 and the silicon controlled rectifier 184 which is turned on as follows. Current is suppled from brush 37 through conductor 42, diode 53, resistor 57, transistor 56, light emitting diode 70 of optical coupler 67 through brush 41, rail 203, resistor 240 to the base of transistor 235 in order to hold off the transistor 221. Current flows from the cable 137 through parallel lamps 217, 220, resistor 231, closed contacts 230, resistor 223, diode 198, resistor 189, diode 187 and the resistor 190 to the gate of silicon controlled rectifier 184. Capacitor 199 supplies current during switching of relay contacts 222. The relay 180 is energized, closing normally open contacts 131 and 135 to apply power to the rails 130 and 132, respectively, in a relative polarity that will drive the carriage toward the teller location.

At this time, the transistor 154 is in a non-conducting state and the transistor 210 is conducting to complete a circuit for the carriage return lamps 215 and 216 from the cable 137 through the diode 211, the transistor 210, the resistor 213, and the closed contacts 214.

Turning once more to the circuit for the carriage that is shown in FIG. 4, appropriate polarity power is applied to the direct current motor 50 to drive the carriage from the delivery location to the teller location. This motor circuit includes the path from the brush 37 through the conductors 42, 43, a normally closed set of relay contacts that are controlled by the relay 72, the motor 50, the thermal protective device 51 and the brush 40.

Because the relay 244 (FIG. 3) is a latching relay, the contact 214 remains in the energized position after the customer releases the switch 242 and this switch springs back into its normal open-circuit condition. Consequently, during most of the distance travelled by the carriage in its movement toward the teller location the signal lamps 215 and 216 continue to illuminate.

As shown in FIG. 3, when the carriage nears the teller location, the rail isolator 143 in the rail 130 breaks the circuit from the power supply 125 to the rail 130 through the path that includes the conductor 126 and the closed relay contacts 131. In this circumstances the brush 37 (FIG. 4) contacts a "dead" section of rail thereby disconnecting the carriage from the power supply 125. As a consequence, power to the motor 50 is interrupted and the now coasting carriage causes the motor to generate a current that is dissipated in the dynamic braking resistor 52 that is connected in parallel with the series combination of the motor 50 and its thermal protective device 51. This coasting causes the carriage to slow swiftly but gently to a stop at the teller location, thereby preventing the tray that is gimballed to the carriage from oscillating in a manner that will cause the contents to be thrown from the tray.

At the teller location, the attendant takes the money from the conveniently tilted, deep basin 36 in the cup 35 (FIG. 2). The order is assembled, packaged and placed by the attendant in the correct tray receptacles (depending on package size and shape) for transport to the customer at the appropriate delivery location. Normally, if the customer is entitled to receive some change, the attendant also places the proper amount in the deep basin 36 of the money cup 35.

With the packaged order and correct change in the tray, the attendant closes the normally open teller send switch 197 (FIG. 3). Thus, a circuit is temporarily completed from the power supply 125 through the conductor 126, the fuse 136, a common potential conductor in the cable 137, the now closed switch 197 and the winding of the relay 200 back to the power supply 125 by way of a common potential conductor in the cable 142 and the conductor 127.

With the relay 200 latched, the normally open relay contacts 222 are closed to establish a circuit continuity that illuminates the "send" lamps 217 and 220 at the teller location.

When the relay 200 is latched, it also opens the normally closed contacts 176 and closes the normally open contacts 160. Upon closing the contacts 160, a circuit is completed between one of the common potential conductors in the cable 137 and a common potential conductor in the cable 142. This circuit includes a path from the closed contacts 160, the winding of the relay 161 and the silicon controlled rectifier 165. As shown, a triggering pulse is provided for the gate electrode 172 in the rectifier 165 after a delay that is determined by the short time constant which the capacitor 157 establishes with the resistor 156, diode 155 and transistor 151 (base current for transistor 151 is supplied through resistor 147, diode 202, rail 203, brush 41, resistor 124, diode 123, conductor 42 and brush 37 to the power supply negative). As the rectifier 165 is triggered and begins to conduct, the relay 161 is energized, thereby closing the normally open contacts 133 and 134 to apply power to the rails 130, 132 in a polarity that is opposite to the polarity applied to the rails to drive the carriage toward the teller location.

Thus, and as best illustrated in FIG. 4, the appropriate polarity on the rail 132 (FIG. 3) is applied to the brush 37 and, from the brush 37 to the motor 50 through the previously described path. From the motor 50 the circuit is then completed to the rail 130 by way of the brush 40. The reversed polarity relative to that which was applied to the carriage to drive it toward the teller location now causes the motor's commutator to turn in the opposite direction, driving the carriage back to the particular delivery location.

Turning again to FIG. 3, the carriage send lamps 217 and 220 at the teller location are illuminated by completion of a circuit from the lamps, through the contacts 222, the conducting transistor 221 and the diode 226.

As the carriage nears the delivery location the brush 41 senses a path to the negative side of the power supply via the third rail 203, the conductor 241, the resistor 209, cable 142, to cable 127 (power supply minus). Within the carriage (FIG. 4) the relay 72 is then energized by establishing a further path from the brush 37 the conductor 42, the diode 53, the conductor 54, the diode 71, the winding of the relay 72, the resistor 74 and the conducting transistor 76 to the brush 40.

The transistor 76, moreover, is enabled to conduct because with the proper potential at the third rail brush 41, the transistor 56, in conducting, stimulates the light emitting diode 70 to emit light quanta that drives the optically coupled phototransistor 80 into a conducting mode; With the transistor 80 in a conducting mode in the base-to-collector circuit of the transistor 76, the transistor 76, in turn also conducts.

Energizing the relay 72 in the foregoing manner closes the normally open contacts 81 and opens the normally closed contacts 82. In this way, the adjustable time delay circuit for illuminating the lamp bank 114 that is provided by the resistor 84, the trimming potentiometer 85 and the capacitor 86 is allowed to charge in a unique manner.

Thus, power is applied to one side of the lamp bank 114 through the now closed relay contacts 81. The transistor 101, which also is coupled to the closed relay contacts 81 through the resistor 104 is in a conducting mode at this point in circuit operation. In these circumstances, the transistors 110 and 111 also are turned on to essentially share the rather high surge current that characterizes the cold lamps in the bank as those lamps first turn on to illuminate temporarily an advertisement or the like on the carriage. As the voltage builds up across the voltage dividers formed by the resistors 117 or 120 and 122 the transistor 103 turns on, thereby turning the transistor 101 off and limiting the current through the lamp bank.

As the lamps in the bank 114 warm from use, the cold surge current declines and trasistor 103 turns off, allowing the transistor 101 to conduct fully. Meanwhile, the charge has been increasing on the capacitor 86 until, after a predetermined time delay, it reaches a level that turns on the programmable unijunction transistor 83. The output from the transistor 83 cathode is a pulse which is sufficient, when it is applied to the gate electrode 93 of the silicon controlled rectifier 94, to enable the rectifier to conduct. The effect of the conducting rectifier 94 is to turn off the transistor 101. With the transistor 101 nonconducting, the transistors 110 and 111 also cease to conduct, thereby causing the lamps in the lamp bank 114 to go out.

When the relay 72 was energized because the brush 41 registered a third rail voltage near the delivery location normally closed contacts 44 in the conductor 43 opened, thus disconnecting the motor 50 from the brush 37 and hence, the power supply (not shown in FIG. 4). In these circumstances, the dynamic braking feature of the parallel combination of the motor 50 and the resistor 52 permits the package-laden tray and carriage to come swiftly and smoothly to a stop at the delivery location. In this manner, the movement of the carriage is arrested without causing the tray to undertake a pendulum-like sway that would risk spillage or dropping the packaged food and change.

There are occasions during which it is desirable for the attendant at the teller location to stop the motion of the carriage and tray in mid-passage and change the direction of the carriage and tray combination, sending it either back to the delivery location or back to the teller location, depending on the point of origin. In these circumstances, to avoid abrupt carriage stops that would cause the tray to sway, it has been found in accordance with another feature of the invention to coast the carriage to a stop, dwell several seconds to allow time for the tray to stop swaying and then reverse the direction of the carriage. To achieve these functions, and for example to send the carriage back to the delivery location, the attendant closes the normally open teller send switch 197 (FIG. 3). This latches the relay 200 which causes the normally open contacts 160 to close and the closed contacts 176 to open. The relay 180 is released, opening the contacts 131 at the rail 130 and opening the contacts 135 at the rail 132. On the other hand, after a period of time required for the capacitor 157 to charge to a level that will permit the trigger diode 170 to conduct, causing the rectifier 165 to conduct current, the relay 161 is energized and reverses the polarity off the rails by closing the contacts 134 at the rail 130 and closing the contacts 133 at the rail 132.

During the period in which no power is applied to the rails, the motor 50 coasts to a stop and does not start moving the carriage in the opposite direction until the capacitor 157 charges to a suitable level to trigger diode 170 enabling the rectifier 165 to complete the circuit for the relay 161. In this way, the carriage stop, tray damping dwell time and reverse movement of the carriage are achieved.

In a similar manner, the attendant may return a dispatched carriage to the teller location by closing the normally open teller return switch 245 to unlatch the relay 244. Note in this respect that although relays 200 and 244 are treated as separate relays for simplified description, it is nevertheless preferable that they should be latching and unlatching windings on the same relay. In this situation, the contacts 160 which had been closed, now are opened to deenergize the relay 161 and cause the contacts 133, 134 to release. During this period in which no power is applied to the rails the dynamically braked motor 50 (FIG. 4) in the carriage coasts to a stop. The formerly opened contacts 176 now are closed permitting the capacitor 188 to charge to a level that will cause the trigger diode 187 to conduct, causing rectifier 184 to conduct, completing the circuit for the relay 180. Thus, energizing the relay 180 closes the contacts 131 and 135, and reverses the polarity of the rails 130, 132, respectively. This reversed polarity causes the motor 50 (FIG. 4) to reverse direction and drive the carriage back to the teller location.

Thus there is provided a simple, reliable and efficient system for conveying packaged foodstuffs from a teller location to one or more delivery points without risking spillage through undampened tray oscillations, and the like.

We claim:

1. A packaged foodstuffs delivery system for transferring a tray between a teller position and at least one delivery station comprising at least three electrically conductive rails for conveying the foodstuffs, a carriage electrically coupled to said rails, an electrically dynamically braked motor within said carriage for driving said carriage, means for gimballing the tray to said carriage for transporting the foodstuffs therewith between the teller position and the delivery station, circuit means for propelling said carriage in either direction along said rails, at least one of said rails having an isolation section for causing said electrically dynamically braked motor to coast to a stop in order to enable said carriage and said gimballed tray also to stop in a manner that retains the foodstuffs on the tray, contacts for reversing the electrical polarity on said rails in order to reverse said carriage direction between the teller position and the delivery station, and delay means for causing said carriage to coast to a stop before reversing said carriage direction in order to enable said carriage and said gimballed tray to stop in a manner that retains the foodstuffs on the tray.

2. A packaged foodstuffs delivery system for transferring a tray between a teller position and at least one delivery station comprising at least three electrically conductive rails for conveying the foodstuffs, a carriage electrically coupled to said rails, an electrically dynamically braked motor within said carriage for driving said carriage, means for gimballing the tray to said carriage for transporting the foodstuffs therewith between the teller position and the delivery station, circuit means for propelling said carriage in either direction along said rails, at least one of said rails having an isolation section for causing said electrically dynamically braked motor to coast to a stop in order to enable said carriage and said gimballed tray also to stop in a manner that retains the foodstuffs on the tray, contacts for reversing the electrical polarity on said rails in order to reverse said carriage direction between the teller position and the delivery station, and delay means for causing said carriage to coast to a stop before reversing said carriage direction in order to enable said carriage and said gimballed tray to stop in a manner that retains the foodstuffs on the tray, a lamp bank on said carriage, lamp bank circuit means for sensing the polarity of the electricity on one of said rails and energizing said lamp bank in response thereto as said dynamically braked motor coasts to a stop at the delivery station, and further delay means for deenergizing said lamp bank after a predetermined time.

* * * * *